(12) United States Patent  
Soscia

(10) Patent No.: US 6,636,332 B1  
(45) Date of Patent: Oct. 21, 2003

(54) SYSTEM FOR REPRODUCING IMAGES AND METHOD THEREOF

(75) Inventor: Peter P. Soscia, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/019,506

(22) Filed: Feb. 5, 1998

(51) Int. Cl.$^7$ .......................... H04N 1/00; H04N 1/387; H04N 1/04

(52) U.S. Cl. ................... 358/401; 358/450; 358/483; 358/444; 358/474; 358/296; 358/473; 340/825.34

(58) Field of Search ................... 358/401, 501, 358/474, 448, 451, 403, 404, 444, 296, 483, 468, 909.1, 1.16, 1.18; 340/825.33–825.35; 382/312, 232; 348/96, 97; 380/23, 51

(56) References Cited

U.S. PATENT DOCUMENTS

| | | | |
|---|---|---|---|
| 4,171,864 A | 10/1979 | Jung et al. ................. | 359/2 |
| 4,889,367 A | 12/1989 | Miller ....................... | 283/88 |
| 5,301,044 A | 4/1994 | Wright ..................... | 358/500 |
| 5,337,361 A | 8/1994 | Wang et al. ................ | 380/51 |
| 5,384,846 A * | 1/1995 | Berson et al. .............. | 380/51 |
| 5,505,494 A | 4/1996 | Belluci et al. .............. | 283/75 |
| 5,506,697 A | 4/1996 | Li et al. .................... | 358/448 |
| 5,568,550 A | 10/1996 | Ur ........................... | 382/306 |
| 5,635,012 A | 6/1997 | Belluci et al. .............. | 156/277 |
| 5,742,685 A * | 4/1998 | Berson et al. .............. | 380/23 |

FOREIGN PATENT DOCUMENTS

| | | |
|---|---|---|
| EP | 0 653 720 A2 | 5/1995 |
| EP | 0 735 420 A1 | 10/1996 |

OTHER PUBLICATIONS

Berardi, et al., "Improved Print and Method and Apparatus for Printing, Storing and Retrieving an Image Record", USSN 08/816,474, (Attorney Docket No. 69531A), filed Mar. 13, 1997. Patent No. 5,841,885.

\* cited by examiner

Primary Examiner—Cheukfan Lee  
(74) Attorney, Agent, or Firm—Walter S. Stevens; Norman Rushefsky

(57) ABSTRACT

System for reproducing images and method thereof. An image acquisition device belonging to the system acquires the image and converts the image into indicia, which is defined by a digitally encoded compressed representation of the image in the form of one or more data image files. The image files are downloaded to a first printer which prints the indicia onto a first recording medium. The indicia printed on the first recording medium may overlay the image without interfering with enjoyment of the image because the indicia is printed in an invisible dye. In order to produce a quality reproduction of the original image, a sensor, which is disposed in sensing relationship to the indicia on the first recording medium, senses the indicia and generates a digital output signal in response to the indicia sensed thereby. An imaging device, such as a second printer, coupled to the sensor accepts the digital output signal and prints the quality reproduction of the image, including indicia, onto a second recording medium in accordance with the sensor output signal. The reproduction of the image can itself be reproduced in the same manner in order to provide a second quality reproduction. Of course, as many quality reproductions as desired may be provided in this manner. Each reproduction has the same quality as the original image because each reproduction is produced from the digital indicia printed on each reproduction. Also, rather than being printed, the reproduced image, which has the same quality as the original, may be displayed on a suitable monitor or electronically transmitted by means of one or more telecommunication systems.

34 Claims, 5 Drawing Sheets

SYSTEM FOR REPRODUCING IMAGES AND METHOD THEREOF

BACKGROUND OF THE INVENTION

This invention generally relates to apparatus and methods of reproducing images and more particularly relates to a system and method of reproducing images such that successive reproductions thereof (i.e., copies of copies) maintain the image quality of the original.

In order to reproduce a printed image, an analog image scanning system is often used. In such an analog system, a first record containing the printed image is scanned at a predetermined frequency (i.e., lines per unit time) and resolution (i.e., pixels per unit area). As the first record is scanned, a light source illuminates the image and a photosensitive electronic detector senses light reflected from the image. As the sensor senses the reflected light, the detector generates an analog signal in response to the reflected light sensed by the detector. A converter receives the analog signal and converts the analog signal into a digital signal, which is then transmitted to a computer whereat the digital signal is stored. The computer then passes the digital signal to a printer connected to the computer, so that a reproduction of the original image appearing on the first record is rendered onto a second record.

However, it has been observed that analog image scanning systems may produce reproductions having less image quality than the original. This degradation in image quality is exacerbated when successive reproductions (i.e., copies from copies) are made. Degradation in image quality is observed as different information being present in the reproduced printed image compared to the original image. That is, such analog systems may add information not present in the original. Alternatively, such analog systems may subtract information that was present in the original. This is primarily due to differences in calibration between equipment used to make the original image and equipment used to make the reproductions. The resulting reproduced image will thereby have degraded image quality because the information contained in the reproduced image is necessarily different from the information contained in the original.

Methods of controlling image quality in reproduced images are known. One such method is disclosed in U.S. Pat. No. 5,301,044 titled "Marking Material Containing A Taggant, And Method Of Producing An Image" issued Apr. 5, 1995 in the name of Joseph D. Wright. The method of the Wright patent uses taggants incorporated into marking materials (e.g., toner, ink or marking film) used to create and control reproduced images in a reproduction machine. According to this patent, the reproduction system identifies the particular material forming the image being scanned by recognizing one or more taggants therein. The taggant may fluoresce or reflect light of invisible wavelengths. Thus, taggant does not interfere with the color of the marking material in which the taggant is utilized within the image. When each taggant fluoresces or reflects light at a predetermined wavelength, the output light for each taggant is detected and compared to a table containing taggant wavelengths and information associated therewith, such as identity of toners, identity of inks or marking films, and spectral response of colorants in the toners and inks. This information is used by the reproduction system to enable or control color enhancement, correction, translation and other functions. Although this patent discloses a method of controlling quality of printed images produced by a reproduction system, this patent does not suitably address the problem of degradation of printed images appearing on copies made from copies. Moreover, this patent does not address the problem of unpredictable variability in image quality that occurs due to differences in calibration between copiers.

Therefore, there has been a long-felt need to provide an apparatus for and method of reproducing images such that successive reproductions thereof (i.e., copies of copies) maintain the image quality of the original.

SUMMARY OF THE INVENTION

The invention resides in a system for and method of producing a quality reproduction of an image. An image acquisition device belonging to the system acquires the image and converts the image into indicia, which is defined by a digitally encoded compressed representation of the image in the form of one or more data image files. The image files are downloaded to a first printer which prints the image and indicia onto a first recording medium. The indicia printed on the first recording medium may overlay the image without interfering with enjoyment of the image because the indicia is invisible, such as being printed in an invisible dye. In order to produce a quality reproduction of the original image, a sensor, which is disposed in sensing relationship to the indicia on the first recording medium, senses the indicia and generates a digital output signal in response to the indicia sensed thereby. An imaging device, such as a second printer, coupled to the sensor accepts the digital output signal and prints the quality reproduction of the image, including invisible indicia, onto a second recording medium in accordance with the sensor output signal. This reproduction of the image can itself be reproduced in the same manner in order to provide a second quality reproduction. Of course, as many quality reproductions as desired may be provided in this manner. Each reproduction has the same quality as the original image because each reproduction is produced from the invisible digital indicia printed on each reproduction. Also, rather than being printed, the reproduced image, which has the same quality as the original, may be displayed on a suitable monitor or electronically transmitted by means of one or more telecommunication systems.

An object of the present invention is to provide an apparatus and method of reproducing images such that successive reproductions thereof (i.e., copies of copies) maintain the image quality of the original.

A feature of the present invention is the provision of a recording medium having the image thereon and invisible digitally encoded compressed indicia representative of the image preferably overlaying the image.

Another feature of the present invention is the provision of a sensor to sense the indicia for subsequent printing or display of a quality reproduction on an output device.

An advantage of the present invention is that successive reproductions of an image (i.e., copies of copies) can now be provided while maintaining the image quality of the original irrespective of variability in scanning input or output devices chosen to acquire or print and display the reproduced image.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
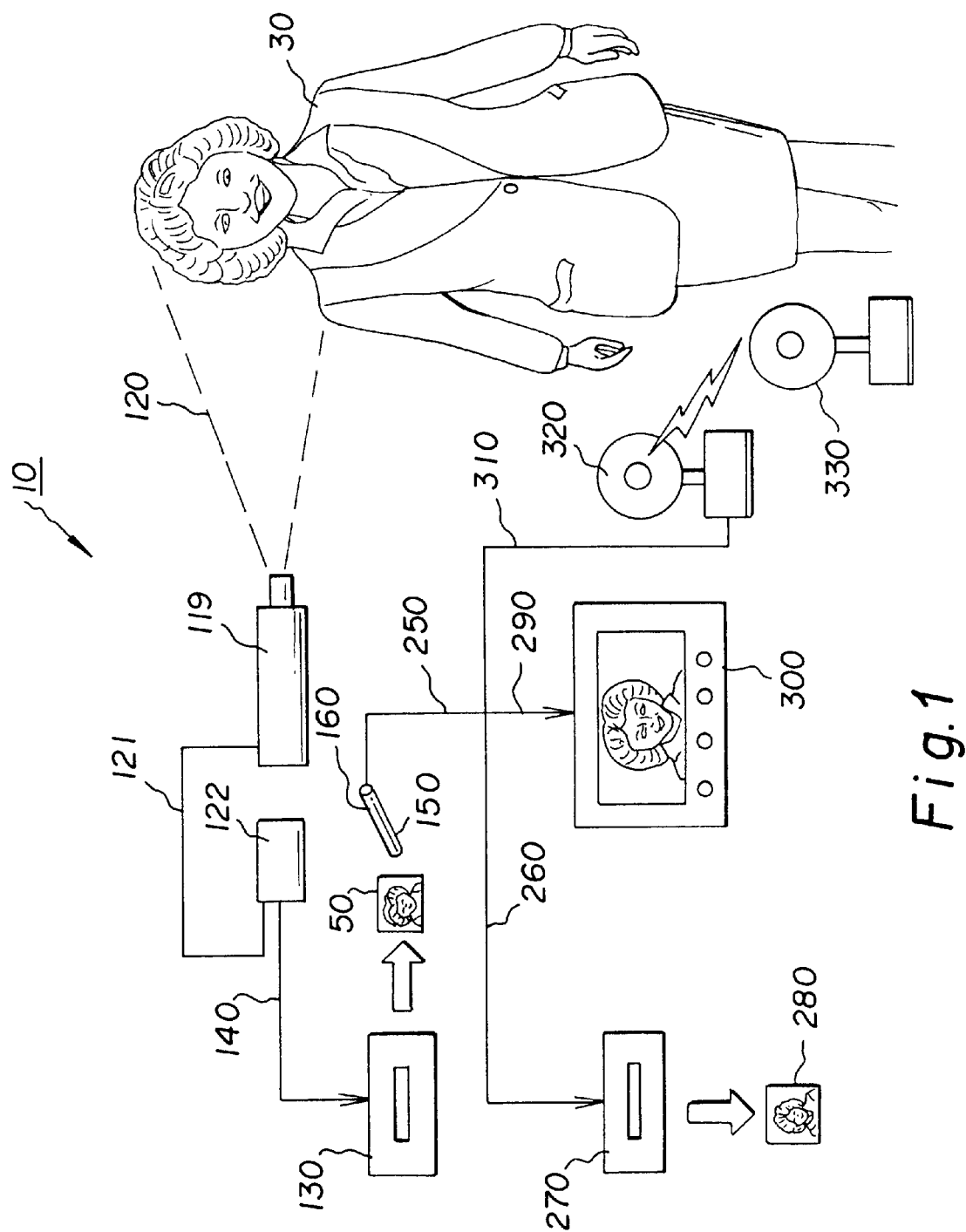
FIG. 1 shows the system of the invention.
Figure 2:
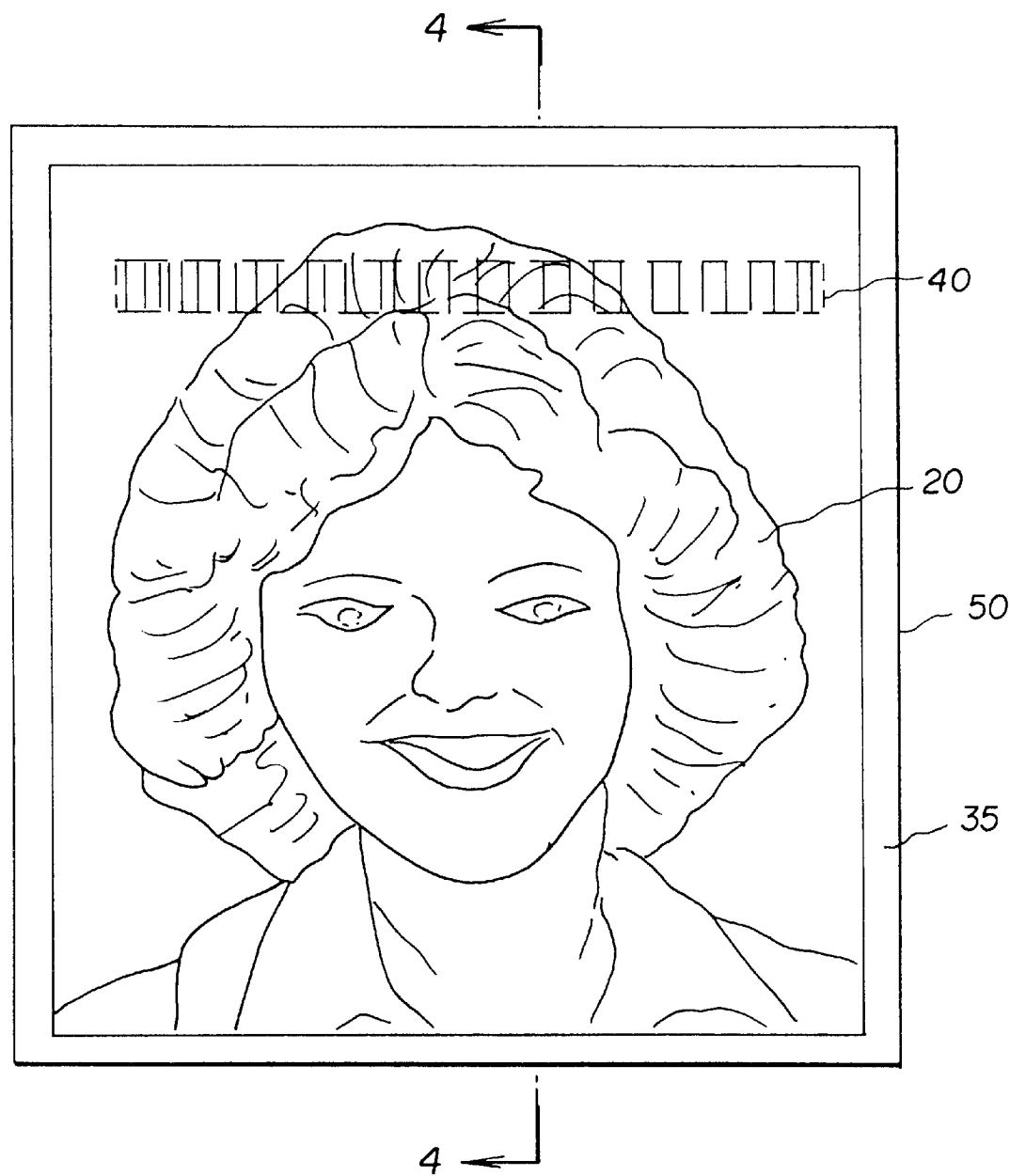
FIG. 2 shows a first recording medium provided by the system.
Figure 3:
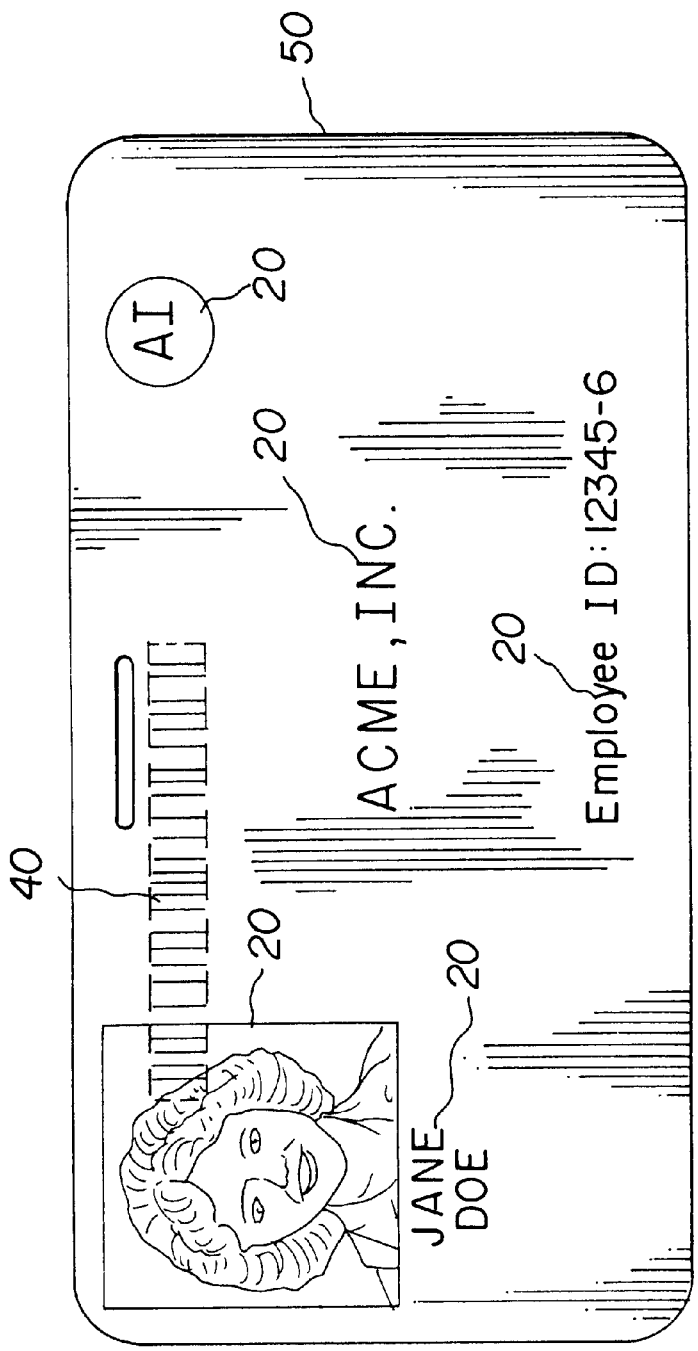
FIG. 3 shows another embodiment of the first recording medium.

Therefore, referring to FIGS. 1, 2 and 3, there is shown the subject matter of the present invention which is a system, generally referred to as 10, for reproducing an image 20 of a subject 30 such that successive reproductions of image 20 (i.e., copies of copies) maintain the image quality of the original image 20. Of course, subject 30 may be a human subject (as shown), an inanimate object or alpha-numeric lettering. As used herein, the terminology "image" includes any blank border region 35. Of course, "Image quality" is ascertainable by observing whether different information (i.e., more or less information) is present in the reproduced image compared to the original. To achieve constant image quality, system 10 first prints "invisible" indicia 40, digitally representing image 20, onto any desired portion of the original image 20, which indicia 40 may be "appended to" image 20. As used herein, the terminology "appended to" means indicia 40 is printed over the surface of image 20 or under the surface of image 20 or between any combination of intermediate color planes comprising image 20. In addition, the terminology "appended to" also includes the case where indicia 40 is laid down so that it is interposed between pixels comprising image 20, which is most useful in a half-toning system. As described in more detail hereinbelow, system 10 then reads indicia 40 and subsequently produces a quality copy of the original image 20. For reasons described more fully hereinbelow, indicia 40, which is printed on image 20, is preferably in the form of a two-dimensional encoded variable data array comprising a digital data image file, which may be compressed to conserve space. In this regard, it is known that data compression is desirable because data compression reduces the amount of electronic "space" the data image file occupies in electronic memory. Of course, such a compressed data image file must be later decompressed before the data image file can be used for the purpose disclosed herein. To facilitate later decompression of the compressed data image file, the data image file is initially compressed into any one of many well-known file formats. On the other hand, the two-dimensional encoded variable data array defining the digital data image file may comprise uncompressed data, if desired. However, in this case, more electronic "space" is required for storing the uncompressed data image file in electronic memory. Examples of such known file formats usable with the invention include JPEG (Joint Photographic Excellence Group), GIF (Graphic Interchange Format), TIFF Tagged Data Image File Format), BMP (Bit Mapped), FlashPix, or Photo CD Image Pac. As used herein, the terminology "variable data" means data which may vary from one record to another.

Figure 4:
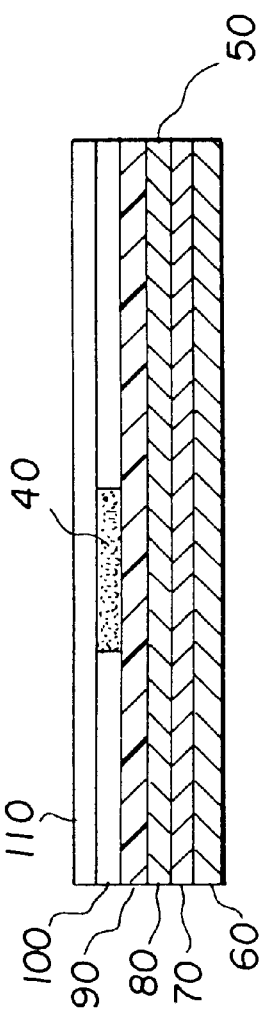
FIG. 4 is a view taken along section line 4—4 of FIG. 2.

Referring to FIG. 4, indicia 40, which may laid-down (i.e., printed) over image 20, is preferably "invisible" dye (i.e., dye imperceivable to the naked eye) in order to preserve fidelity and aesthetic enjoyment of image 20 when indicia 40 is laid-down over image 20. More specifically, indicia 40 is preferably a dye having spectral absorption in the invisible infrared region or ultraviolet region of the radiation spectrum. Such a dye is selected so that the dye does not absorb or fluoresce light in the human visible spectrum, but which is nonetheless visible to optical reading devices capable of illuminating indicia 40 with infrared light or ultraviolet light. For this purpose, the dye may be 4,4'-bis (triazin-2-ylamino)stilbene-2,2'-disulfonic acids; 2-(stilben-4-y)naphthotriazoles; or 2-(4-phenylstelben-4-yl) benzoxazoles, or other suitable dye.

Still referring to FIG. 4, indicia 40 is preferably overlaid (i.e., printed) on image 20, which is itself printed on a first recording medium 50. First recording medium 50 includes a substrate 60, which by way of example only, and not by way of limitation, may be a suitable paper comprising, for example, a cellulose-based ester material (nitrate or acetate, or the like). Overlaying substrate 60 is a first layer (i.e., first color plane) 70 formed of a first colorant material, such as a magenta dye. Overlaying first layer 70 is a second layer 80 (i.e., second color plane) formed of a second colorant material, such as a cyan dye. Overlaying second layer 80 is a third layer 90 (i.e., third color plane) formed of a third colorant material, such as a yellow dye. The three layers are magenta, cyan and yellow dyes in CYM color space. However, it should be appreciated that the three dyes may alternatively be red, green and blue dyes in RGB color space. Overlaying third layer 90 is a fourth layer 100 (i.e., fourth color plane), which includes image 20 printed in the previously mentioned invisible dye. If desired, a fifth layer 110 (i.e., fifth color plane) may overlay the entirety of fourth layer 100, which fifth layer 10 is a clear protective layer for protecting fourth layer 100 from damage. For this purpose, fifth layer 110 may be formed of polyvinyl acetale or adhesive-backed transparent polyester substrate. The manner in which system 10 forms indicia 40 (i.e., fourth layer 110) on first recording medium 50 is described more fully hereinbelow.

Therefore, returning to FIG. 1, an image acquisition device, such as a digital camera 119, is provided for capturing image 20 of subject 30. Camera 119 may be a Kodak DC 120 Camera™, or the like, available from the Eastman Kodak Company located in Rochester, N.Y. Camera 119 includes a flash unit (not shown) for illuminating subject 30, a viewing lens or digital image display area (not shown) for viewing subject 30, and a lens (also not shown) for receiving light 120 reflected from subject 30. Camera.119 transforms reflected light 120 into a digital data image file representing subject 30 and stores the digital data image file in memory (not shown) of camera 119. The digital data image file may be in any one of known image file formats, such as JPEG, GWF, TIFF, BMP, FlashPix, or Photo CD Image Pac. It is important that the data image file format be compressed. This is important so that the data image file can be rendered in a two-dimensional data array that is within the printable area available on first recording medium 50. This is also important in order to conserve electronic "space" in the memory of camera 119. Camera 119 then generates an output signal containing the digital data image file which was temporarily stored in memory of camera 119. This output signal travels along a first cable 121 to a image first processor 122 for processing, as described more fully presently.

Figure 5:
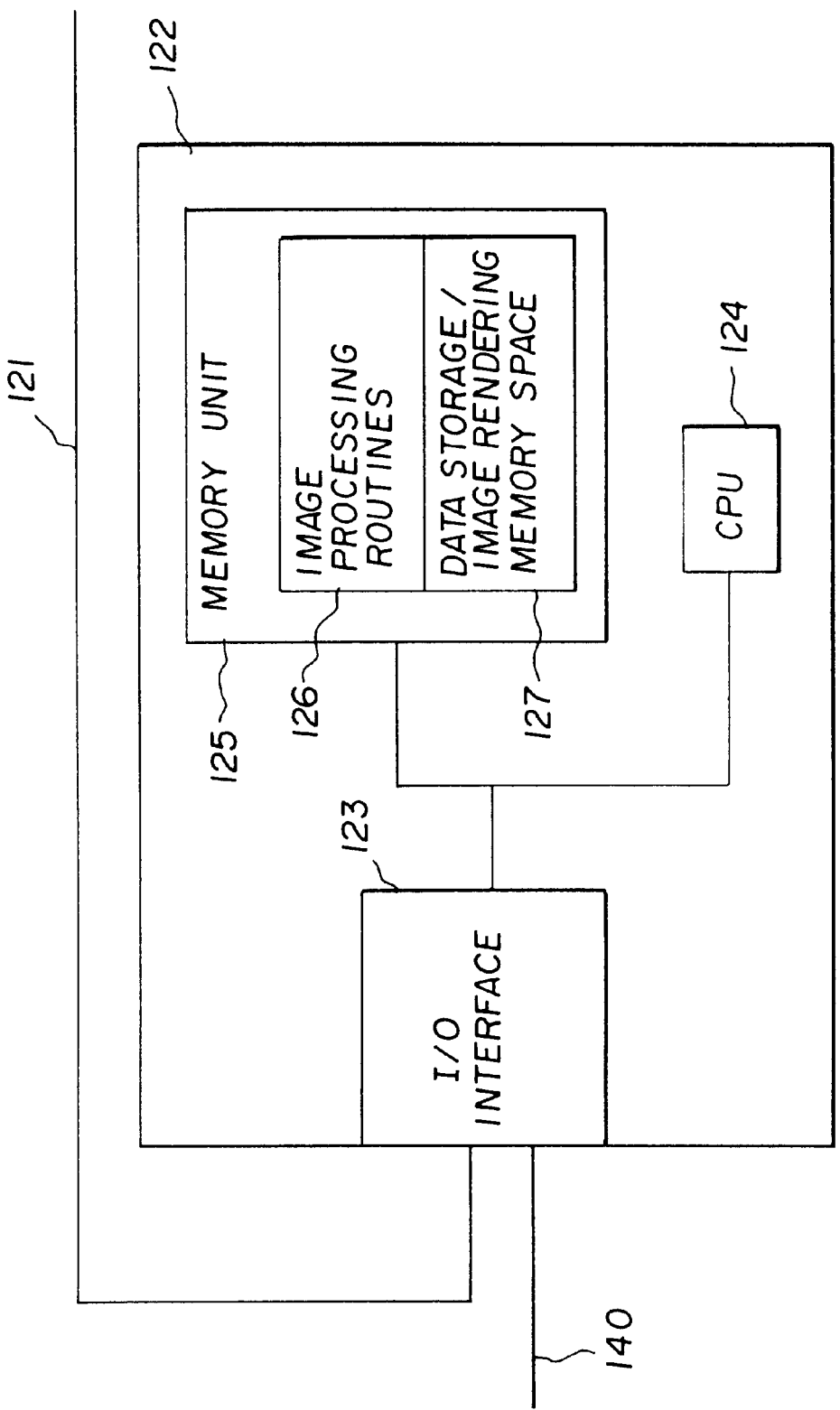
FIG. 5 shows an image processor belonging to the invention.

Referring now to FIG. 5, image first processor 122 includes an input/output interface 123, which receives the output signal transmitted from camera 119. In order to perform its processing function, image first processor 122 also includes a CPU (Central Processing Unit) 124 and a memory unit 125. Memory unit 125 includes one or more image processing routines 126 used to control CPU 124 when processing the compressed image data file. In addition to image processing routines 126, memory unit 125 also includes an area data storage and image rendering memory space 127 for storing the image data file received from camera 119. It is appreciated that there may be a plurality of data files respectively representing a full-color rendered image of subject 30. As defined herein, a "rendered image" is an image data file(s) which has been processed and formatted for printing. Thus, such a rendered image data file(s) may comprise a plurality of two dimensional data sets, each data set corresponding to a different colorant layer to be printed. There may be three colorant layers comprising, for example, magenta, cyan and yellow dyes in CYM color space. However, it may be appreciated that the three dyes may alternatively be red, green and blue dyes in RGB color space. The "invisible" colorant comprising indicia 40 is treated as an additional colorant layer to be rendered. Therefore, in rendering color images, CPU 124 generates from the image data file(s) received from memory camera 119, a separate data file corresponding to each of the three colorants in addition to the image data file comprising the invisible colorant.

Referring again to FIG. 1, a first image forming device, such as a first printer 130, is connected to input/output interface 123 by a second cable 140 for receiving an output signal generated by image first processor 122, which output signal comprises the three image data planes which may be in compressed file format, if desired, corresponding to each of the three dyes. In addition, the output signal comprises the image data plane (i.e., indicia 40) which includes the invisible dye in compressed file format. When first printer 130 receives this output signal from image first processor 122, first printer 130 prints indicia 40 and image 20 onto first recording medium 50. It is understood from the teachings hereinabove, that image 20 comprises first, second and third colorant layers 70/80/90 preferably overlaid one upon the other. Indicia 40 overlays third colorant layer 90 of image 20 without interfering with visual enjoyment of image 20 because indicia 40 is formed in fourth layer 100 as an "invisible" colorant. First printer 130 may be a thermal dye transfer printer, inkjet printer, electrophotographic printer or the like. After first printer 130 prints encoded and compressed indicia 40 and image 20 onto first recording medium 50, indicia 40 is ready to be optically scanned to produce a quality reproduction of image 20, as described more fully hereinbelow.

Figure 6:
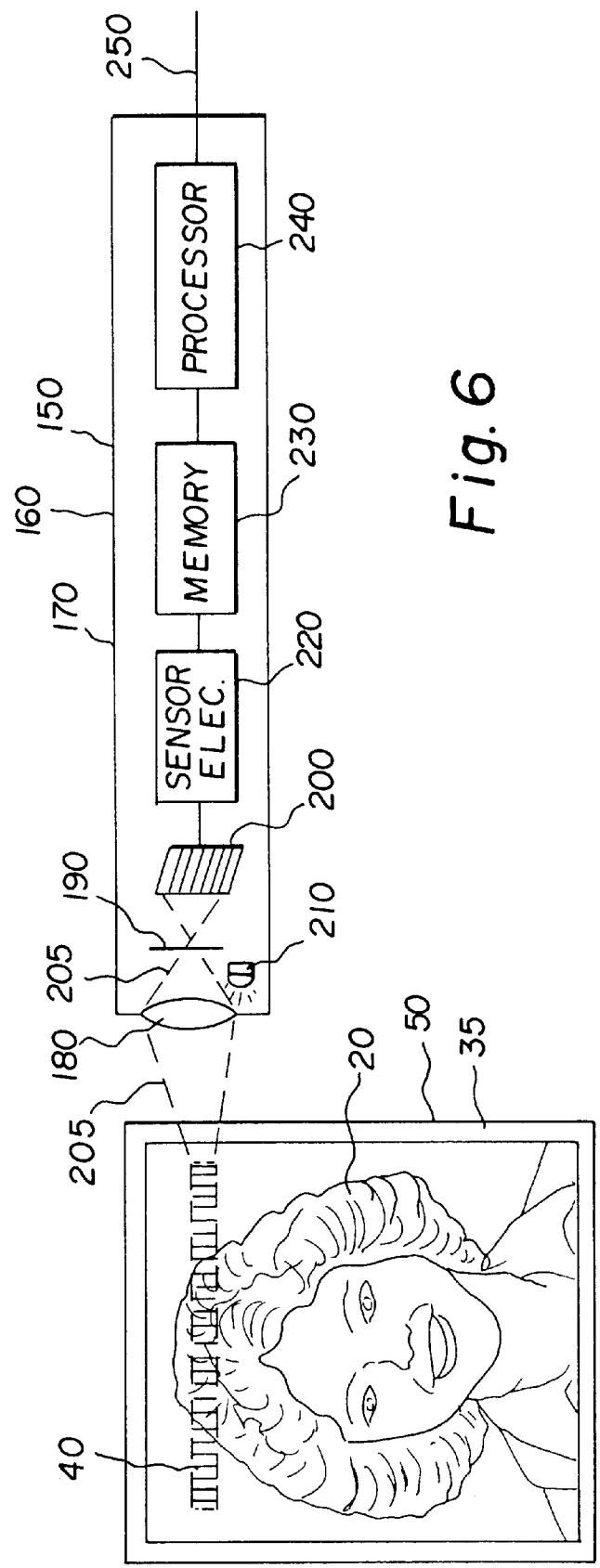
FIG. 6 shows a sensor belonging to the invention.

Referring now to FIGS. 1 and 6, a sensor 150 is disposed in sensing relationship to indicia 40 for sensing indicia 40. Sensor 150 senses the two-dimensional data array of indicia 40 and processes the sensed information such that the two-dimensional data array of indicia 40 is converted back to digital data in a compressed file format. Sensor 150 is preferably a hand-held wand 160 and comprises an elongate housing 170 having a focusing lens 180 at an end portion thereof. Although sensor 150 is described herein as a hand-held wand, it is appreciated that sensor 150 may be a flat-bed scanner (not shown), such as the KODAK IMAGELINK SCANNER 923™ available from the Eastman Kodak Company located in Rochester, N.Y. Alternatively, sensor 150 may be a feed-through scanner, a drum scanner, a film scanner, or other scanning device. When sensor 150 is a hand-held wand, a spectral filter 190 is disposed in housing 170 and is co-axially aligned with, but spaced-apart from, lens 180 for letting through a predetermined wavelength of light and blocking all other wavelengths. Therefore, filter 190 will only allow the wavelength of light corresponding to the fluorescence or absorption wavelengths of light from indicia 40. Alternatively, filter 190 may be coated onto lens 180, rather than being spaced-apart from lens 180, so that sensor 180 is compact. A two-dimensional array image detector 200, such as a CCD (Charge-Couple Device), is in optical communication with filter 190 for detecting light 205 passing through lens 180 and filter 190. Alternatively, detector 200 may be a CMOS device, which is a device formed by the combination of a PMOS (p-type-channel metal oxide semiconductor device) with an NMOS (n-type-channel metal oxide semiconductor device). Thus, detector 200 serves as a semi-conductor storage device to convert light 205 detected thereby into electronic digital form. An auxiliary light source 210 may be provided, if desired, for enhancing detection of two-dimensional indicia 40 by illuminating indicia 40. It should be appreciated that light source 210 may be a laser for emitting a laser light beam to be intercepted by indicia 40 and reflected therefrom. In this case, detector 200 is a laser light detector for detecting the laser light beam reflected from indicia 40. In any case, detector 200 is preferably capable of detecting the entire two-dimensional image 20 without a user of system 10 having to move wand 160 in a scanning motion over indicia 40 in order to sense indicia 40. Also disposed in housing 170 are image sensor electronics 220 for driving detector 200 data capture. That is, sensor electronics 220 controls rate of data capture and converts analog charges on CCD detector 200 into digital data format. Electrically connected to sensor electronics 220 is a memory 230. The purpose of memory 230 is to store digital representation of indicia 40. Electrically connected to memory 230 is a second processor 240. The purpose of second processor 240 is to decode and decompress the data according to requirements of an associated output device. The image of indicia 40 received through lens 180 is an analog of image 20. That is, indicia 40 sensed by sensor 150 is in analog form, which should be converted back into a digitally encoded and compressed data image file in order to be usable for subsequently reproducing image 20. Second processor 240 then transmits this digitally encoded and compressed output signal, such as by means of a third cable 250 and a fourth cable 260, to a second printer 270 for reprinting image 20 on a second recording medium 280 without degradation of image quality, as described more fully presently. Second printer 270 may be a thermal dye transfer printer, inkjet printer, electrophotographic printer or the like. Alternatively, the output signal generated by processor 240 may be transmitted by means of third cable 250 and a fifth cable 290 to a display unit 300, which may be a computer monitor, television monitor, suitable "overhead" projection device, or the like, for displaying image 20. In addition, the second processor 240 output signal may be transmitted by means of third cable 250 and a sixth cable 310 to a first telecommunications system 320, which in turn transmits (e.g., by broadcasting) the second processor 240 output signal to a second telecommunications system 330 for printing or display of reproduced image 20. Second printer 280, display unit 300, first telecommunications system 320 or second telecommunications system 330, as the case may be, receives the converter output signal and thereafter decompresses and decodes the second processor 240 output signal into its digital binary representation. In all cases, invisible indicia 40 resides on all reproductions of image 20, such that the indicia 40 residing on respective reproductions of image 20 may be scanned in the manner described hereinabove. Thus, each reproduction of image 20 has the same image quality as image 20 appearing on first recording medium 50 because complete information pertaining to the original image 20 is retained undegraded in the two-dimensional digital data array defining indicia 40.

Therefore, it should be understood from the description hereinabove that digital camera 119 captures light 120 reflected from subject 30 and transforms light 120 preferably into three two-dimensional image data files representing full-color image 20 of subject 30. Camera 199 also generates indicia 40, which is another image data file that represents image 20 as a two-dimensional encoded compressed variable data array. These image data files are transmitted to image first processor 122, which processes the data files to first printer 130. First printer 130 prints indicia 40 and image 20 onto first recording medium 50.

It should be understood from the description hereinabove that when a quality reproduction of image 20 is desired, indicia 40 is first sensed by wand 160, which is preferably capable of detecting the entire two-dimensional indicia 40 without the user having to move wand 160 in a scanning motion over indicia 40 in order to sense indicia 40. The scanning signal generated by wand 160 is transmitted to second printer 270 for printing image 20 on second recording medium 280 without degradation of image quality. Alternatively, the scanning signal generated by wand 160 may be transmitted to display unit 300. As yet another alternative, the scanning signal generated by wand 160 may be transmitted to a first telecommunication system 320, which may be a cellular phone, for subsequent transmission to a second telecommunication system 330.

In another embodiment of the present invention, first printer 130 may be of a type which "prints" indicia 40 in fourth layer 100 in the form of magnetic media. In this case, wand 160 is selected such that it senses/reads the magnetic emanations of the magnetic media before producing its output signal which is transmitted to second printer 270, display unit 300 and/or first and second telecommunication systems 320/330.

It may be appreciated from the teachings herein that an advantage of the present invention is that successive reproductions of an original image (i.e., copies of copies) can now be provided while maintaining the image quality of the original irrespective of variability in scanning input or output devices chosen to acquire or print and display the reproduced image. This is so because each reproduction is made in accordance with digital indicia rather than by the analog means of the prior art.

While the invention has been described with particular reference to its preferred embodiments, it is understood by those skilled in the art that various changes may be made and equivalents may be substituted for elements of the preferred embodiments without departing from the invention. For example, indicia 40 need not be invisible; rather indicia 40 may be visible but printed in a "blank area" (e.g., border 35) on first recording medium 50, so as not to disturb the aesthetic enjoyment of image 20.

As is evident from the foregoing description, certain other aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Therefore, what is provided is an apparatus and method of reproducing images such that successive reproductions thereof (i.e., copies of copies) maintain the image quality of the original.

PARTS LIST

10 . . . system
20 . . . image
30 . . . subject
35 . . . blank border region
40 . . . indicia
50 . . . first recording medium
60 . . . substrate
70 . . . first layer
80 . . . second layer
90 . . . third layer
100 . . . fourth layer
110 . . . fifth layer
119 . . . camera
120 . . . reflected light
121 . . . first cable
122 . . . first processor
123 . . . input/output interface
124 . . . central processing unit (CPU)
125 . . . memory unit
126 . . . image processing routines
127 . . . memory space
130 . . . first printer
140 . . . second cable
150 . . . sensor
160 . . . wand
170 . . . housing
180 . . . lens
190 . . . filter
200 . . . detector
205 . . . light
210 . . . light source
220 . . . sensor electronics
230 . . . memory
240 . . . second processor
250 . . . third cable
260 . . . fourth cable
270 . . . second printer
280 . . . second recording medium
290 . . . fourth cable
300 . . . display unit
310 . . . sixth cable
320 . . . first telecommunication system
330 . . . second telecommunication system

What is claimed is:

1. A system for producing a quality reproduction of an image, comprising:

(a) a recording medium having the image thereon and indicia representative of the image appended to the image, wherein said recording medium has the indicia appended over the surface of the image as a compressed data image file;

(b) a sensor disposed in sensing relationship to the indicia for sensing the indicia and for generating an output signal in response to the indicia sensed thereby; and (c) an image reproduction device coupled to said sensor for accepting the output signal and for generating the quality reproduction of the image in accordance with the output signal.

2. The system of claim 1, further comprising an image acquisition device coupled to said recording medium for acquiring the image and for transferring the image to said recording medium, said image acquisition device being adapted to convert the image into the indicia.

3. The system of claim 1, wherein said recording medium has the indicia appended over the surface of the image as an encoded and compressed data image file.

4. The system of claim 1, wherein said recording medium has the indicia interposed between pixels of the image as a compressed data image file.

5. A system for producing successive generations of quality reproductions of an image, each on a respective recording medium, each reproduction having the image thereon and indicia representative of the image printed on the image, the system comprising:

(a) an image acquisition device associated with a recording medium for acquiring the image and converting the image into the indicia representative of the acquired image;

(b) an image forming device connected to said image acquisition device for printing the image and the indicia onto the recording medium wherein said recording medium has the indicia appended over the surface of the image as a compressed data image file;

(c) a sensor disposed in sensing relationship with the indicia printed on the recording medium for sensing the indicia and for generating an output signal in response to the indicia sensed thereby; and (d) an image reproduction device connected to said sensor for accepting the output signal and for generating the quality reproduction of the image in accordance with the output signal.

6. The system of claim 5, wherein said recording medium has the indicia printed on the image as an encoded compressed data image file.

7. The system of claim 5, wherein said recording medium has the indicia printed on the image as an unencoded data image file.

8. The system of claim 5, wherein said recording medium has the indicia printed on the image in an invisible dye.

9. A system for producing a quality reproduction of an image, comprising:

(a) an image acquisition device for acquiring the image and converting the image into a digitally encoded data image file representative of the image;

(b) an image forming device connected to said image acquisition device for receiving the data image file, decoding the data image file and printing the data image file onto a recording medium in the form of a quality reproduction of the image and indicia invisibly printed on the image and comprising a digitally encoded compressed data image file representative of the image wherein said recording medium has the indicia appended over the surface of the image as a compressed data image file;

(c) a sensor disposed to sense the indicia printed on the recording medium for sensing the indicia and for generating an output signal representing the indicia sensed thereby in the form of a digitally encoded compressed data image file; and (d) an image reproduction device connected to said sensor for receiving the output signal and decoding and decompressing the data image file, the image reproduction device adapted to thereafter generate the quality reproduction of the image in accordance with the output signal.

10. The system of claim 9, wherein said recording medium has the indicia printed on the image as an optically-encoded data image file.

11. The system of claim 9, wherein said recording medium has the indicia printed on the image as a magnetically-encoded data image file.

12. The system of claim 9, wherein said sensor comprises:

(a) a laser light source for emitting a light beam to be intercepted by the data image file and reflected therefrom; and (b) a light detector associated with said light source for detecting the light beam reflected from the data image file.

13. The system of claim 12, wherein said light detector comprises a photo-sensitive charged couple device.

14. The system of claim 12, wherein said light detector comprises a photo-sensitive CMOS device.

15. The system of claim 9, wherein said recording medium has the indicia printed on said recording medium in a dye capable of absorbing infrared light and the data image file is invisible in visible light.

16. The system of claim 15, wherein said recording medium has the indicia printed on said recording medium in a dye capable of fluorescing when absorbing the infrared light, so that the indicia is invisible, except when exposed to the infrared light.

17. The system of claim 9, wherein said recording medium has the indicia printed on said recording medium in a dye capable of absorbing ultraviolet light, so that the data image file is invisible in visible light.

18. The system of claim 17, wherein said recording medium has the indicia printed on said recording medium in a dye capable of fluorescing when absorbing the ultraviolet light, so that the indicia is invisible, except when exposed to the ultraviolet light.

19. The system of claim 9, wherein said sensor comprises a hand-held wand.

20. A recording medium including a visually perceptible image of a face of a human thereon and further including an invisible digitally encoded data image file printed on the image and representative of the image, the data image file being machine readable and containing sufficient information relative to the image so as to be usable by a reproduction apparatus to produce a quality reproduction of the image without need of the perceptible image and wherein said recording medium has the indicia appended over the image as a compressed data image file.

21. The recording medium of claim 20, wherein said data image file is encoded and compressed.

22. The recording medium of claim 20, wherein said data image file is interposed between pixels comprising the image.

23. The recording medium of claim 20, wherein said data image file is optically-encoded.

24. The recording medium of claim 20, wherein said data image file is magnetically-encoded.

25. A method of producing a quality reproduction of an image, comprising the steps of:

(a) providing a recording medium having the image thereon and indicia representative of the image appended to the image wherein said recording medium has the indicia appended over the surface of the image as a compressed data image file;

(b) sensing the indicia and generating an output signal in response to the indicia sensed thereby by disposing a sensor in sensing relationship to the indicia; and (c) accepting the output signal and generating the quality reproduction of the image in accordance with the output signal by operating an image reproduction device coupled to the sensor.

26. The method of claim 25, further comprising the step of acquiring the image and transferring the image to the recording medium by coupling to a printer an image acquisition device, the image acquisition device capable of converting the image into the indicia for printing onto the recording medium.

27. The method of claim 25, wherein the step of providing the recording medium comprises the step of providing a recording medium having the indicia appended over the surface of the image as an encoded and compressed data image file.

28. The method of claim 25, wherein the step of providing the recording medium comprises the step of providing a recording medium having the indicia appended over the surface of the image and the indicia is interposed between pixels comprising the image.

29. A method of producing a quality reproduction of an image, comprising the steps of:

(a) acquiring the image by using an image acquisition device, the image acquisition device converting the image into indicia representative of the image;

(b) printing the image and indicia onto a recording medium by operating an image forming device coupled to the image acquisition device wherein in said printing said recording medium has the indicia printed so as to be appended over the image as a compressed image data file;

(c) disposing a sensor in sensing relationship to the indicia and sensing the indicia printed on the recording medium and generating an output signal in response to the indicia sensed; and (d) in response to the output signal generating the quality reproduction of the image in accordance with the output signal by operating an image reproduction device that is coupled to the sensor.

30. The method of claim 29, wherein the recording medium has the indicia printed on the image as an encoded and compressed data image file.

31. The method of claim 29, wherein the recording medium has the indicia printed on the image as an unencoded data image file.

32. The method of claim 29, wherein the recording medium has the indicia printed on the image in an invisible dye.

33. A recording medium produced in the printing step of the method of claim 29, the recording medium including a visually perceptible image of a face of a human thereon and further including an invisible digitally encoded data image file printed on the image and representative of the image wherein said recording medium has the indicia appended over the surface of the image as a compressed data image file, the data image file being machine readable and containing sufficient information relative to the image so as to be usable by a reproduction apparatus to produce a quality reproduction of the image without need of the perceptible image.

34. The recording medium of claim 33 and wherein the indicia is interposed between pixels comprising the image.

* * * * *